June 18, 1963 W. J. HAITH 3,094,180
ROCK DRILLING BIT
Filed May 23, 1960

INVENTOR.
William J. Haith
BY
Hovey, Schmidt, Johnson & Hovey
ATTORNEYS.

United States Patent Office 3,094,180
Patented June 18, 1963

3,094,180
ROCK DRILLING BIT
William J. Haith, 205 Market St., Beatrice, Nebr.
Filed May 23, 1960, Ser. No. 31,075
1 Claim. (Cl. 175—401)

This invention relates to rock drilling bits and more particularly to such bits as are used to drill holes for the insertion of explosives for blasting purposes.

It is the primary object of this invention to provide a rock drilling bit which has cutting teeth facing in both directions whereby the bit may be used to drill the desired hole and when such drilling is accomplished the bit may be easily removed therefrom through the use of cutting edges on the cutting teeth which face in a direction opposite to the cutting edges on the teeth used to drill the hole.

It is well known that problems are encountered in removing rock drilling bits from holes which have been drilled because of the hole filling with a clay, soft earthen material, rock or shale which contains water and which cannot be expelled from the hole through the use of air passed through the drill stem and out a hole provided in the drilling bit. Such material frequently packs about the bit and the stem so that it is difficult and frequently impossible to remove the drilling bit and the stem which carries the bit from the hole after the latter has been drilled.

Thus it is an aim of the present invention to provide a rock drilling bit which, in addition to the usual set of cutting teeth, has a second set of cutting teeth disposed rearwardly of the first or usual set of cutting teeth, the cutting edges of the second set of teeth facing in a direction opposite to the cutting edges of the first set of teeth whereby the second set of teeth may be utilized to cut away any material which has packed around the drill stem or drilling bit as the hole was being drilled and thus remove the stem and the bit from the hole.

A yet further aim of this invention is to provide a sleeve which can be carried by a drill stem rearwardly of a conventional drilling bit, the sleeve having cutting teeth formed thereon and facing in a direction opposite to the teeth of the conventional drilling bit whereby the cutting teeth on the sleeve may be used to remove the drill stem and bit from the hole if the same should become stuck therein.

Other objects of this invention include details of construction which will become apparent from the following specification and accompanying drawing, wherein.

Figure 1:
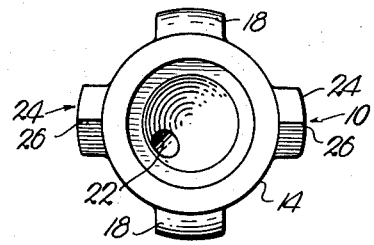
FIGURE 1 is a top plan view of one form of rock drilling bit made pursuant to this invention.

A rock drilling bit constituting one form of the present invention is broadly designated as 10, said bit having a plurality of cutting edges 12 formed at one end of a shank portion 14 thereof. Bit 10 is normally carried by a drill stem 16, at one end of the stem, whereby the cutting edges 12 which are the apex edges of a plurality of cutting teeth 18 may be utilized to drill a hole in rock.

Stem 16 is tubular and has a passageway 20 formed therethrough, which passageway communicates with the interior of bit 10 whereby air forced into passage 20 of stem 16 may pass out of bit 10 through a hole 22 provided therein adjacent cutting teeth 18. A bit such as 10 may be screwed or otherwise suitably secured to stem 16 and the stem 16 is generally coupled with an air operated device (not shown), which device imparts a hammering and rotating action to the bit 10 through stem 16 whereby the desired hole may be drilled.

Figure 2:
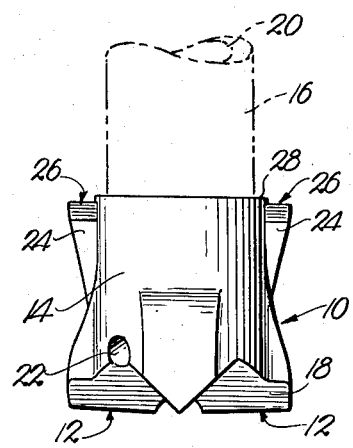
FIGURE 2 is an elevational view of the rock drilling bit shown in FIG. 1.
Figure 3:
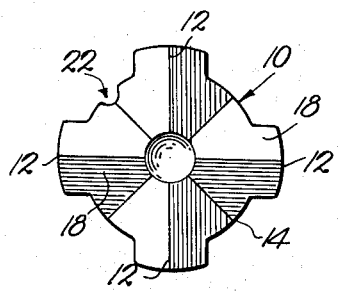
FIGURE 3 is a bottom plan view of the bit shown in FIGS. 1 and 2.

In the form of invention shown in FIGS. 1–3 bit 10 has formed on the shank portion 14 thereof a second set of cutting teeth 24 which are substantially triangular in configuration as best seen in FIG. 2 and each of which has a cutting edge 26 facing in a direction opposite to cutting edges 12 of the first set of cutting teeth 18 of bit 10. It is to be noted that cutting teeth 24 are formed integrally with bit 10 and are in effect a rearwardly extending continuation of certain of cutting teeth 18. The cutting edges 26 of teeth 24, which are formed by the taper of the upper portion of teeth 24, or which may be suitably inserted in or secured to teeth 24, lie in a plane substantially parallel to cutting edges 12, said plane being spaced slightly from the plane of the upper edge 28 of bit 10. Manifestly, any number of cutting teeth such as 24 may be provided but in the form shown in FIGS. 1–3 a pair of such teeth 24 are provided, the teeth being disposed in opposed relationship to each other as clearly seen in FIGS. 1 and 2.

From the foregoing it will be appreciated that a bit such as 10, through the utilization of cutting teeth 18 having cutting edges 12, may be used to drill a hole for blasting or similar purposes and if the air forced through passage 20 and out hole 22 should not result in the expulsion of cuttings from the hole being drilled and if the same should pack about bit 10 and drill stem 16, the rotary action imparted to stem 16 and bit 10 may be continued and an upward pull on stem 16 exerted whereby teeth 24, through cutting edges 26, will drill away the material packed about the bit 10 and stem 16 to allow the same to be removed from the drilled hole.

Figure 4:
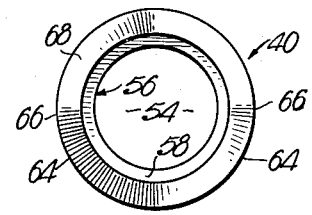
FIG. 4 is a top plan view of the sleeve adapted to be used in conjunction with a rock drilling bit.
Figure 5:
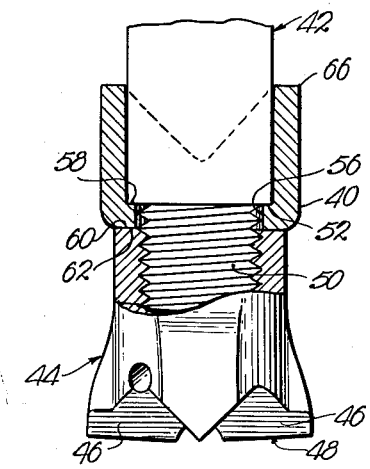
FIG. 5 is an elevational view of a rock drilling bit carried by a stem, showing the sleeve mounted in conjunction therewith, parts being in section to reveal details of construction.
Figure 6:
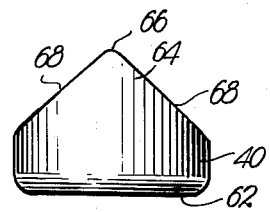
FIG. 6 is an elevational view of one end of the sleeve.

The form of invention shown in FIGS. 4–6 constitutes a modified form wherein is provided a sleeve 40 adapted to be carried by drill stem 42 above a conventional drill bit 44. As best seen in FIG. 5, the conventional bit 44, which has cutting teeth 46 with cutting edges 48, is internally threaded whereby the same may be screwed upon a threaded portion 50 of stem 42. Above threaded portion 50 stem 42 is provided with a downwardly facing shoulder 52 and, as is clearly illustrated in FIG. 5, sleeve 40, as a result of central opening 54 provided therein, may be passed over the threaded portion 50 and moved therealong to a point whereby inturned annular flange 56 of sleeve 40 has one face 58 thereof engaging shoulder 52 of stem 42. Subsequent to such mounting of the sleeve 40 upon stem 42 bit 44 may be screwed onto the threaded portion 50 of stem 42 whereby the uppermost edge 60 of bit 44 engages the second or opposite face 62 of flange 56 of sleeve 40. Thus it will be appreciated that sleeve 40 is held in tight engagement between shoulder 52 formed on stem 42 and the upper edge 60 of drill bit 44, whereby the sleeve will be caused to rotate and move with the stem 42 and bit 44 as movement is imparted thereto by suitable drilling machinery. Other suitable means may of course, also be employed to prevent sleeve 40 from rotating with respect to stem 42 and to insure that sleeve 40 is held in a fixed position with respect to stem 42 and bit 40.

As is apparent from FIGS. 4–6, sleeve 40 in the form chosen for illustration, has a pair of cutting teeth 64 said cutting teeth 64 being substantially triangular in configuration, the base edges thereof being a continuation of sleeve portion 40 and the apex edges thereof constituting cutting edges 66, said base and apex edges being joined by inclined edges 68. The cutting teeth 64 may be formed as an integral continuation of sleeve 40 or may be suitably carried thereby as by insertion therewithin and are disposed in opposed relationship to one another whereby the same may be on opposite sides of the stem 42 when the sleeve 40 is mounted with respect thereto as seen in FIG. 5.

It is thus apparent that sleeve 40 may be used in conjunction with conventional drilling bits and may be mounted on the stem carrying such bits in the manner hereinabove described whereby the cutting teeth 64 and the cutting edges 66 and 68 thereof may be utilized to remove the stem 42 and bit 44 from a hole which has been drilled through the use of cutting teeth 46 and cutting edges thereon 48, said edges 66 and 68 serving to cut away any material which may have packed about stem 42 and bit 44.

The second set of cutting teeth 24 and the sleeve 40 as above described in no way interfere with the regular drilling function and do not impede the removal of a bit from a hole should the second set of cutting teeth not be utilized, but it will be appreciated that by forming such second cutting teeth as 24 on a drill bit or through the provision of a sleeve such as 40 having cutting teeth 64 in association with a conventional drilling bit as above described the problem or removing a drill stem and bit from a hole is eliminated for in each instance the second set of cutting teeth may be utilized to in effect reverse drill the bit and stem from the hole through any material which may have filled the hole or packed about the stem and bit and which would otherwise make removal of the latter extremely difficult and expensive.

Having thus described the invention, what is claimed as new and desired to be secured by Letters Patent is:

A rock drilling bit adapted to be carried by a drill stem, said bit comprising a shank portion surrounding said stem and having a first set of cutting teeth formed at one end thereof; and a tubular sleeve carried by said stem adjacent the opposite end of said shank portion, said stem extending through the sleeve, said sleeve having a second set of cutting teeth formed thereon extending in a direction opposite to that of said first set of teeth, said sleeve having an inturned, annular flange formed thereon, said flange having one face thereof in abutting engagement with said opposite end of the shank portion and the opposite face thereof in engagement with a shoulder on the drill stem whereby to prevent rotation of said sleeve relative to said stem, said second set of teeth being substantially triangular in configuration, lying in substantially the same plane as said first set of teeth, the base edges thereof being adjacent said sleeve and the apex portions thereof being in overlying engagement with said drill stem at a point spaced from said flange.

References Cited in the file of this patent

UNITED STATES PATENTS

| | | |
|---|---|---|
| 1,754,830 | MacClatchie | Apr. 15, 1930 |
| 1,816,568 | Carlson | July 28, 1931 |
| 2,519,861 | Turner | Aug. 22, 1950 |
| 2,607,561 | Alger | Aug. 19, 1952 |
| 2,746,722 | Schneider | May 22, 1956 |
| 2,821,364 | Godfrey | Jan. 28, 1958 |
| 2,904,312 | Schneider | Sept. 15, 1959 |